US012252286B2

(12) United States Patent
Gentili et al.

(10) Patent No.: US 12,252,286 B2
(45) Date of Patent: Mar. 18, 2025

(54) ANVIL, A TRANSVERSAL SEALING SYSTEM, FILLING MACHINES, AND A METHOD FOR PRODUCING PACKAGES

(71) Applicant: TETRA LAVAL HOLDINGS & FINANCE S.A., Pully (CH)

(72) Inventors: Luca Gentili, Ascoli Piceno (IT); Fabrizio Fenu, Modena (IT); Per Johansson, Malmö (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 123 days.

(21) Appl. No.: 17/786,686

(22) PCT Filed: Dec. 14, 2020

(86) PCT No.: PCT/EP2020/086002
§ 371 (c)(1),
(2) Date: Jun. 17, 2022

(87) PCT Pub. No.: WO2021/122465
PCT Pub. Date: Jun. 24, 2021

(65) Prior Publication Data
US 2023/0024331 A1   Jan. 26, 2023

(30) Foreign Application Priority Data

Dec. 20, 2019 (EP) .................. 19218420.8

(51) Int. Cl.
*B65B 51/30* (2006.01)
*B65B 51/14* (2006.01)
*B65B 51/22* (2006.01)

(52) U.S. Cl.
CPC ............ *B65B 51/30* (2013.01); *B65B 51/144* (2013.01); *B65B 51/225* (2013.01)

(58) Field of Classification Search
CPC ....... B29C 65/08; B65B 51/30; B65B 51/144; B65B 51/225

(Continued)

(56) References Cited

U.S. PATENT DOCUMENTS 6,178,724 B1   1/2001  Tobolka
10,773,846 B2 * 9/2020  Gentili .............. B29C 66/81435

FOREIGN PATENT DOCUMENTS

EP      1066951 A2    1/2001

OTHER PUBLICATIONS

International Search Report (PCT/ISA/210) and Written Opinion (PCT/ISA/237) mailed on Feb. 9, 2021, by the European Patent Office as the International Searching Authority for International Application No. PCT/EP2020/086002. (9 pages).

* cited by examiner

*Primary Examiner* — James D Sells
(74) *Attorney, Agent, or Firm* — BUCHANAN INGERSOLL & ROONEY PC

(57) ABSTRACT

An anvil for forming a transversal sealing of a sleeve-shaped portion of packaging material holding a liquid product, said anvil comprising a main surface, in operation, facing the tube, and a ridge provided on the main surface, the ridge comprising a first section and a second section, wherein the first section of the ridge is placed below the second section such that, in operation, a stress in the packaging material formed by a hydrostatic pressure formed by the liquid product is shifted from a first part of the sleeve-shaped portion placed above the first section of the ridge to a second part placed above the second section.

16 Claims, 5 Drawing Sheets

(58) Field of Classification Search
USPC .................................................. 156/580.2
See application file for complete search history.

ANVIL, A TRANSVERSAL SEALING SYSTEM, FILLING MACHINES, AND A METHOD FOR PRODUCING PACKAGES

TECHNICAL FIELD

The invention relates to packaging technology. More particularly, it is related to an anvil, a transversal sealing system, a roll-fed filling machine, a blanks-fed filling machine and a method for producing packages.

BACKGROUND ART

Today, roll-fed carton filling machines, such as Tetra Brik™ packaging machines marketed by Tetra Pak, are used for packaging liquid food products, such as milk. So-called blanks-fed filling machines are also known. Instead of continuously providing the liquid food product into a tube that is formed into packages, the blanks-fed filling machines are fed with so-called blanks, i.e. sleeve-shaped pieces of packaging material. During production, the blanks are closed in one end, filled with product and thereafter closed in the other end. Examples of such machines are Tetra Rex™ and Tetra Recart™ machines, both marketed by Tetra Pak™.

In both types of filling machines, longitudinal sealings and transversal sealings are provided. In the roll-fed filling machines, the longitudinal sealing is provided such that the tube can be formed and the transversal sealings are provided in the lower end of the tube such that packages can be formed from the tube. In the blanks-fed machines, the longitudinal sealing is often pre-made, i.e. the blanks provided to the machines are already provided with the longitudinal sealings. The transversal sealings are often provided when closing the end before filling, i.e. forming a bottom or a top, as well as when closing the other end. Thus, in the blanks-fed machines there can be two modules forming the transversal sealings. In contrast, in the roll-fed filling machines, two transversal sealings is often made at the same time, i.e. a bottom is formed in one package and a top is formed in a subsequent package. By cutting between the two transversal sealings, the packages can be continuously provided from the tube.

Other alternatives are however also possible. For instance, in a carton bottle machine, such as the Tetra Top™ machine, the packaging material is roll-fed in the sense that the packaging material is provided via a reel. In the machine, the packaging material is cut and longitudinal sealings are provided such that blanks are formed. In a first station, a top section in plastic is injection molded onto the blanks and in a second station, after product has been filled, a transversal sealing is provided such that a bottom of the package is provided.

When forming the transversal sealings, the packaging material is typically heated such that plastic layers are melted and by pressing two sides of the packaging material towards each other the transversal sealings are formed. Heat may be generated by inducing a current in an Aluminum foil in the packaging material by using an inductor, or by providing ultrasound by using an ultrasonic horn. To provide pressure, an anvil may be placed opposite to the inductor or the ultrasonic horn.

To provide for that reliable transversal sealings are formed, different anvil designs have been developed. According to one anvil design, one or several ridges can be provided on a contact surface of the anvil, i.e. a surface facing the packaging material. By having the ridges, the pressure can be applied in a more controlled form, in turn resulting in that more reliable transversal sealings are formed. Another option is to have the anvil flat, and the ultrasonic horn provided with the ridges.

Even though the anvils of today provide reliable transversal sealings, there is nevertheless a possibility to improve. By having even more reliable transversal sealings there will be fewer leaking packages, i.e. fewer quality complaints, and the packages can be able to withstand even tougher treatment, which may be an issue during distribution. In addition to reliability, i.e. assuring that the tube or sleeve is properly closed, improved anvils may also result in that a speed of the filling machines can be increased and also that less energy is needed for providing the transversal sealings.

SUMMARY

It is an object of the invention to at least partly overcome one or more of the above-identified limitations of the prior art. In particular, it is an object to provide an anvil that improves transversal sealings in packages.

According to a first aspect it is provided an anvil for forming a transversal sealing of a sleeve-shaped portion of packaging material holding a liquid product, said anvil comprising a main surface, in operation, facing the tube, and a ridge provided on the main surface, the ridge comprising a first section and a second section, wherein the first section of the ridge is placed below the second section such that, in operation, a stress in the packaging material formed by a hydrostatic pressure formed by the liquid product is shifted from a first part of the sleeve-shaped portion placed above the first section of the ridge to a second part placed above the second section.

The sleeve-shaped portion may be provided with a longitudinal sealing in the first part of the portion.

The second section may comprise a first peripheral sub-section and a second peripheral sub-section, and the second section is a mid-section placed between the first and second peripheral sub-sections.

The packaging material may be provided with a plastic layer comprising polymers, wherein a vertical distance between the first section and the second section may be set with respect to properties of the polymers and/or thickness of the plastic layer and/or stiffness properties of the packaging material.

A continuous transition from the first section to the second section may be provided such that stress in the packaging material is reduced.

The packaging material may be a carton-based packaging material.

According to a second aspect it is provided a transversal sealing system comprising a first and a second anvil according to the first aspect, wherein the first anvil, in operation, is placed above the second anvil, and that the second anvil is placed upside down with respect to the first anvil such that the first section of the ridge of the first anvil is placed below the second section of the ridge of the first anvil, and the first section of the ridge of the second anvil is placed above the second section of the ridge of the second anvil.

The system may further comprise an ultrasonic horn arranged opposite the first and second anvil such that the portion is placed between the ultrasonic horn and the first and the second anvil.

According to a third aspect it is provided a roll-fed filling machine comprising a transversal sealing system according to the second aspect, a package turning device placed downstream the transversal sealing system and configured to turn packages formed by the transversal sealing system upside down, and a folding device configured to fold the packages into a final shape.

According to a fourth aspect it is provided a blanks-fed filling machine comprising a transversal sealing station for closing an end of the portion of packaging material, and a filling station for filling product into the portion, wherein the transversal sealing station comprises an anvil according to the first aspect.

According to a fifth aspect it is provided a method for producing packages, said method comprising providing a sleeve-shaped portion of packing material, transversally sealing the portion, wherein the anvil comprises a main surface, in operation, facing the portion, and a ridge provided on the main surface, wherein the ridge comprises a first section and a second section, wherein in operation the first section is placed below the second section, such that stress in the packaging material formed by the hydrostatic pressure of the liquid product is shifted from a first part of the portion placed above the first section of the ridge to a second part placed above the second section.

The portion may be provided with a longitudinal sealing in the first part of the portion.

The packaging material may be provided with a plastic layer comprising polymers, wherein a vertical distance between the first section and the second section is set with respect to properties of the polymers and/or thickness of the plastic layer and/or a stiffness of the packaging material.

A continuous transition from the first section to the second section may be provided such that stress in the packaging material is reduced.

The packaging material may be a carton-based packaging material.

Still other objectives, features, aspects and advantages of the invention will appear from the following detailed description as well as from the drawings. In addition, features and advantages described in relation to one of the aspects above should, if not explicitly said otherwise, also be understood to be applicable for the other aspects. In the same manner, features and advantages described in relation to examples should be understood to apply to the aspects above if not explicitly stated otherwise. Still another aspect of the invention is to have the anvil flat, and the ultrasonic horn or the inductor provided with the ridges in line with the described anvil design. This will provide the same effect.

BRIEF DESCRIPTION OF THE DRAWINGS

Embodiments of the invention will now be described, by way of example, with reference to the accompanying schematic drawings, in which.

DETAILED DESCRIPTION

Figure 1:
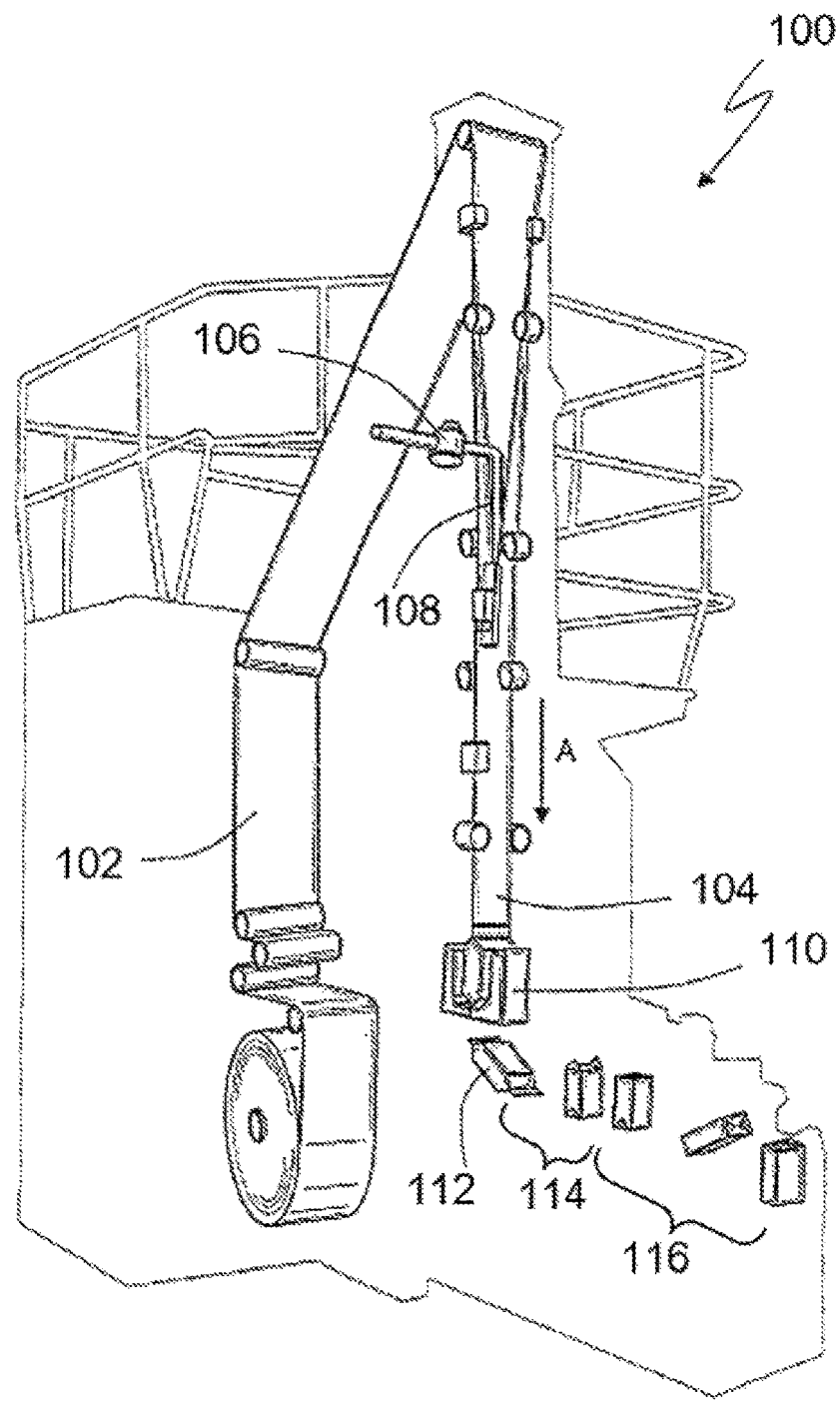
FIG. 1 illustrates a roll-fed filling machine.

FIG. 1 illustrates a roll-fed carton filling machine 100 by way of example. Packaging material 102 provided on a reel is fed from the reel and formed into a tube 104, or in more general terms a sleeve-shaped portion. Liquid product is filled into the tube 104 via a valve 106 and a pipe 108. In a transversal sealing system 110, transversal sealings are made and a lower end of the tube 104 is cut off such that packages 112 are formed. After having made the transversal sealings, the packages 112 can be turned using a package turning device 114, and thereafter, by using a folding device 116, the package 112 can be folded into their final form. This general concept can be implemented in various ways and the example illustrated in FIG. 1 is only one example.

Figure 2:
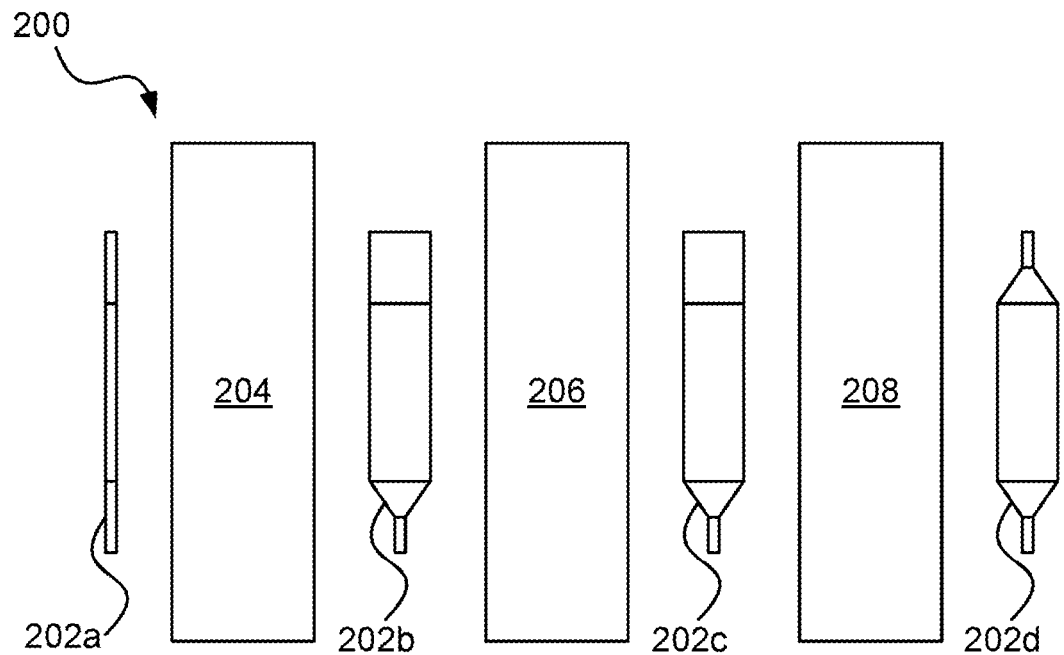
FIG. 2 generally illustrates a blanks-fed filling machine.

Roll-fed filling machines have many advantages, one of them being high speed and as an effect cost-efficiency. However, in case relatively small batches, e.g. 5000 packages, are to be produced it may be worthwhile to consider a blanks-fed filling machine 200 as generally illustrated in FIG. 2.

Unlike the roll-fed filling machine 100 illustrated in FIG. 1, it is common that the blanks-fed filling machines are split into different stations and that the packages are transported between these on conveyor belts. For instance, as illustrated in FIG. 2, a blank 202a, or in more general terms a sleeve-shaped portion, at this stage folded flat, can be fed into a first transversal sealing station 204 in which a first end of the blank 202a is closed with a transversal sealing. The blank 202b, at this stage having the first end closed, can thereafter be fed into a filling station 206, in which the blank 202b is filled with product. Next, the blank 202c, at this stage closed in the first end and filled with the product, can be fed to a second transversal sealing station 208 in which a second end of the blank 202c is closed such that the blank 202d, at this stage filled with product and with both ends closed, can be accomplished. In further stations placed downstream, even though not illustrated, the blank 202d can be folded into a package and also provided with e.g. best before date by using a printer.

The first and the second transversal sealing stations 204, 208 are often designed to do one transversal sealing at a time, and not as the transversal sealing system, as illustrated in FIG. 1, in which two transversal sealings are made at the same time such that the tube 104 can be remained closed in the lower end despite having a part being cut off and formed into the package.

Figure 3:
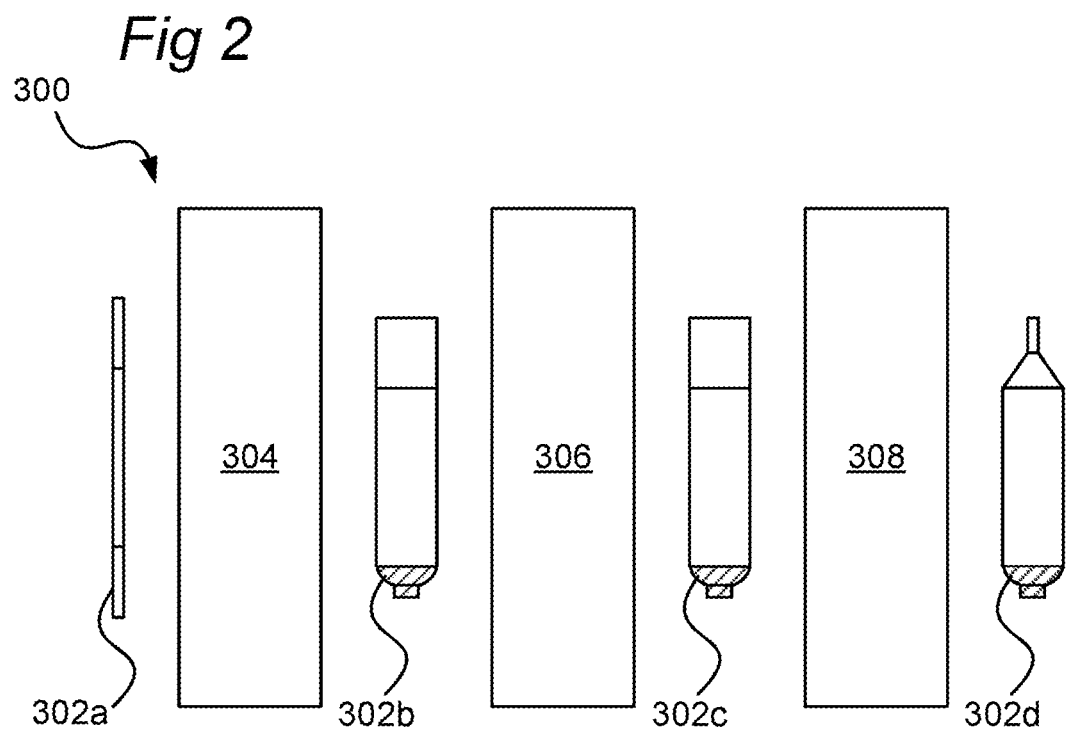
FIG. 3 generally illustrates a carton bottle filling machine.

FIG. 3 generally illustrates a so-called carton bottle machine 300 by way of example. As is the case for the blanks-fed filling machine 200 illustrated in FIG. 2, the carton bottle filling machine 300 comprises different stations. A blank 302a, at this stage being folded flat, may be fed into a molding station 304 in which a top section, made in plastic, is molded onto the blank 302 such that a blank 302b, at this stage having one end closed by the top section, can be formed. Next, the blank 302b can be filled with product in a filling station 306. Thereafter, a blank 302c, at this stage having one end closed by the top section and filled with product, can be fed to a transversal sealing station 308 in which the other end of the blank 302c is closed by that a transversal sealing is made, thereby forming a blank 302d having both ends closed and filled with product. Further stations may be provided downstream, even though not illustrated, for e.g. folding the blank 302d into the package and turning the package.

Put differently, in the carton bottle machine, the first transversal sealing station 204 in the blanks-fed filling machine 200 illustrated in FIG. 2 is replaced by the molding station 304. However, common for both machines, i.e. the blanks-fed machine 200 illustrated in FIG. 2 and the carton bottle machine 300 illustrated in FIG. 3, is that a transversal sealing station is used for closing one end of the blank, or in more general terms the sleeve-shaped portion.

Figure 4:
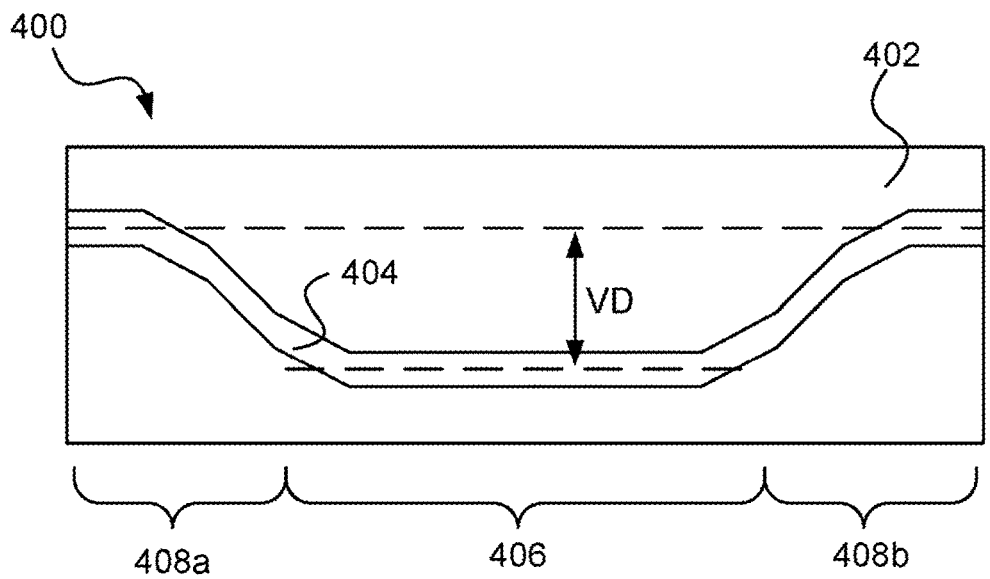
FIG. 4 illustrates a front view of an anvil according to a first embodiment.

In FIG. 4 it is illustrated by way of example an anvil 400 that can be used for generating the transversal sealings in the sleeve-shaped portion, being e.g. the tube 104 illustrated in FIG. 1 or the blanks 202a-d, 302a-d illustrated in FIGS. 2 and 3, respectively. A main surface 402, configured to face the packaging material 104 in operation, can be provided with a ridge 404, i.e. an elongated protrusion. The ridge 404 can be provided with two sections, a first section 406 that can be configured to be held against a mid-portion of the tube 104 or the blank 202a-d, 302a-d, and a second section 408a, 408b being divided in a first peripheral sub-section 408a and a second peripheral sub-section 408b that can be configured to be held against peripheral portions of the tube or the blank, commonly referred to as the sleeved-shaped portion. The sleeve-shaped portion and the anvil may be held such that when forming the transversal sealing, the longitudinal sealing of the sleeve-shaped portion is held against the first section 406.

As illustrated, the first section 406 may be placed below the second section 408a, 408b. An advantage with this is that in operation, a stress in the packaging material 102, more particularly the packaging material forming the transversal sealing, formed by a hydrostatic pressure in turn formed by the product can be shifted from a first part placed above the first section 406 to a second part of the sleeve-shaped portion placed above the second section 408a, 408b. By using a stiffness in the packaging material 102 in this way, a risk that weaknesses are formed in an intersection area in which the longitudinal sealing and the transversal sealing meet can be mitigated or at least reduced.

To determine a vertical distance VD between the first section 406 and the second section 408a, 408b, properties of the packaging material 102 may be taken into account. For instance, in case a carton-based packaging material is used and this comprises a plastic layer, i.e. a polymer based layer, properties of the polymers may be taken into account. Further, a thickness of the plastic layer may be taken into account. In addition, a stiffness of the packaging material may be taken into account, e.g. a thickness of a carton layer of the packaging material.

As illustrated, a transition from the first section 406 to the second section 408a, 408b may be continuous, i.e. not a stepwise change. An advantage with this is that the risk of forming stress in the packaging material is reduced, which in turn provides for more reliable transversal sealings.

The anvil 400 illustrated in FIG. 4 may be found useful in the roll-fed filling machine 100 illustrated in FIG. 1 due to that for roll-fed filling machines the longitudinal sealings are often placed in a middle of the transversal sealing.

Figure 5:
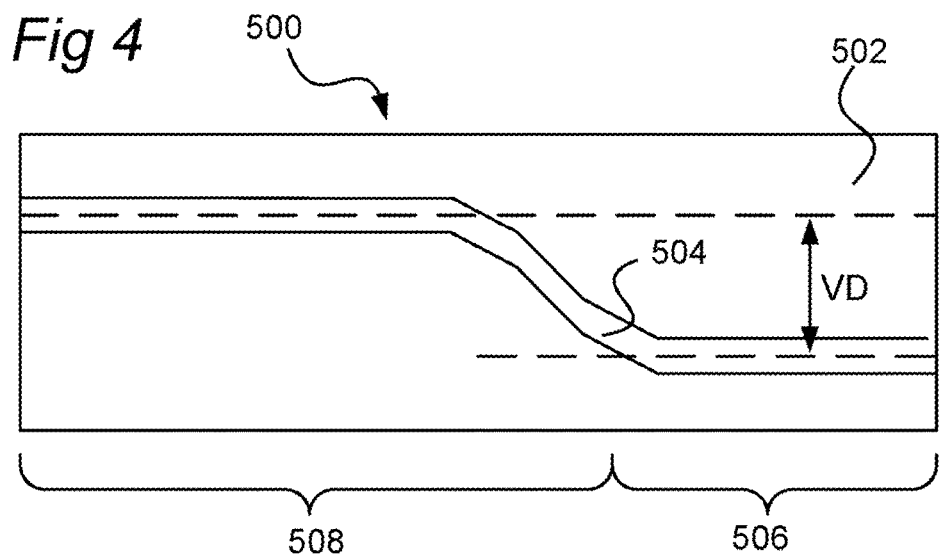
FIG. 5 illustrates a front view of the anvil according to a second embodiment.

FIG. 5 illustrates another anvil 500, also by way of example. As the anvil 400 illustrated in FIG. 4, the anvil 500 illustrated in FIG. 5 is provided with a main surface 502 having a ridge 504. Further, the ridge 504 is divided into a first section 506 and a second section 508, wherein the first section 506 is placed below the second section 508. Unlike the anvil 400 illustrated in FIG. 4, the first section 506 is not placed in the middle such that this is facing a mid-section of the sleeve-shaped portion, but instead placed to face a peripheral section. This may be advantageous in sleeve-shaped filling machines, such as the sleeve-shaped filling machine 200 illustrated in FIG. 2, in which the blanks 202a-d can be provided with the longitudinal sealing in the peripheral section.

Figure 6:
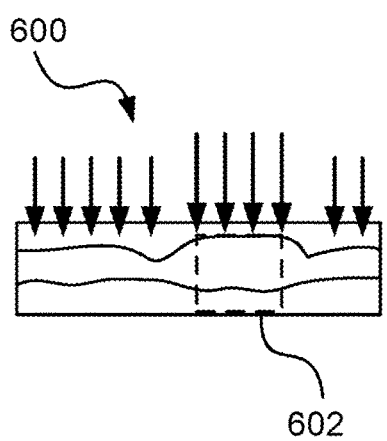
FIG. 6 illustrates an example of a transversal sealing made with a flat-ridged anvil.

In FIG. 6 a transversal sealing 600 is illustrated by way of example. The transversal sealing illustrated is produced by using a flat-ridged anvil, i.e. an anvil not provided the first section placed below the second section, but both section placed on the same horizontal level. As illustrated by arrows, a stress in the packaging material 104 is higher in a cross area 602 in which the longitudinal sealing coincides with the transversal sealing. One reason for having the higher stress in this area is that there are three layers of packaging material in this area compared to two layers outside the area.

Figure 7:
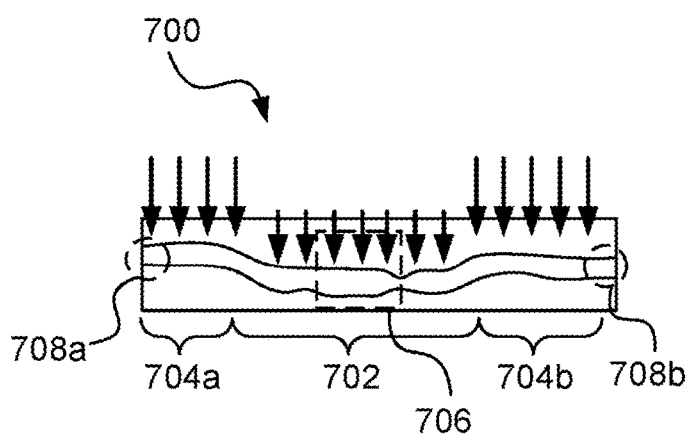
FIG. 7 illustrates an example of a transversal sealing made with the anvil illustrated in FIG. 4.

FIG. 7 illustrates another transversal sealing 700. This transversal sealing 700 has been formed by using the anvil 400 illustrated in FIG. 4. As illustrated by arrows, in a first part 702, corresponding to the first section 406, the stress is lower than in a first and second peripheral sub-part 704a, 704b, corresponding to the first and second peripheral sub-sections 408a, 408b. In a cross area 706, in which the longitudinal sealing and the transversal sealing meet, the stress is thus lower than in the cross area 602 in the transversal sealing 600 illustrated in FIG. 6. By having sloped curvature, i.e. a continuous transition, between the first and section 406, 408a, 408b the stress may also be lowered in corner areas 708a, 708b.

Figure 8A:
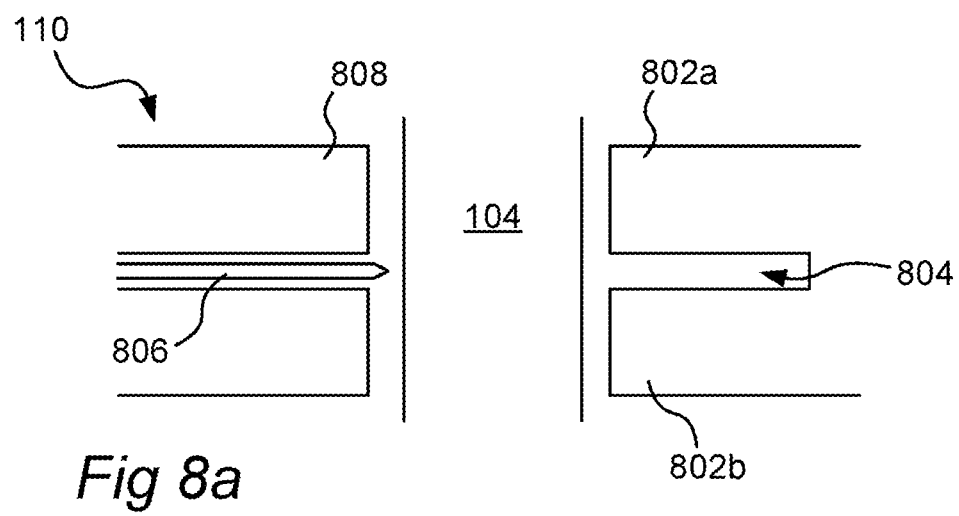
FIGS. 8a and 8b illustrate a transversal sealing system comprising two anvils as illustrated in FIG. 4.
Figure 8B:
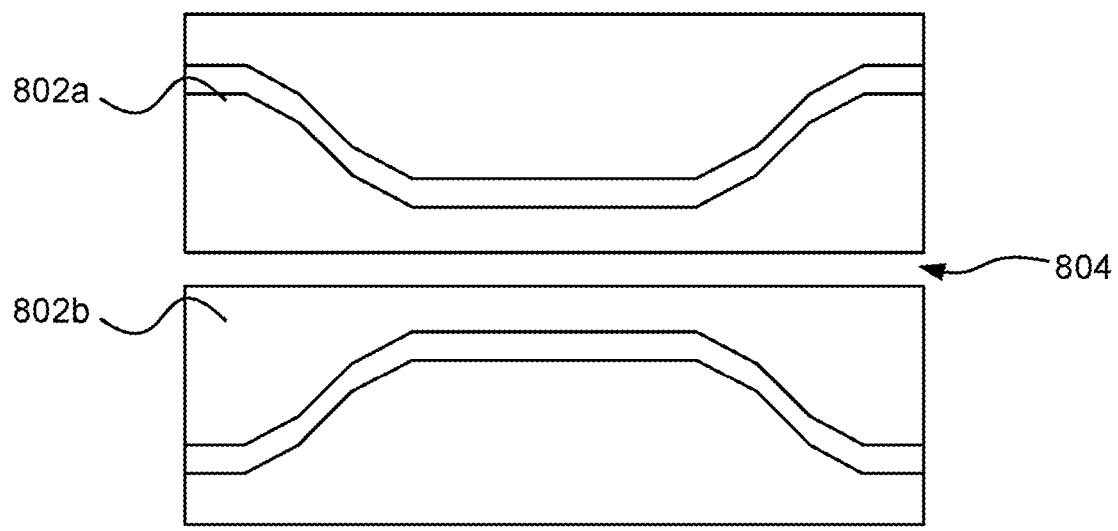

FIGS. 8a and 8b illustrates the transversal sealing system 110 illustrated in FIG. 1 in more detail. FIG. 8a illustrates a cross-sectional side view and FIG. 8b illustrates a front view of the anvils.

As described above, in the roll-fed filling machine 100 illustrated in FIG. 1, two transversal sealings can be made at the same time. This can be achieved by having two anvils 802a, 802b placed at a distance from each other such that a slit 804 between the two are formed. Having this slit 804 provides for that a knife 806 can be used for cutting of the tube 104 after the transversal sealings have been made. On the same side as the knife 806, an ultrasonic horn 808, or other device for generating heat that melts the plastic layer in the packaging material, can be provided.

As illustrated, the two anvils 802a, 802b may be arranged such that they are placed in opposite directions, i.e. a first anvil 802a may be placed with a first section placed below a second section of the ridge and a second anvil 802b can be placed with the first section above the second section. An advantage with this that after the transversal sealings have been made the stress formed by the hydrostatic pressure will be reduced irrespective of how the package is turned.

Figure 9:
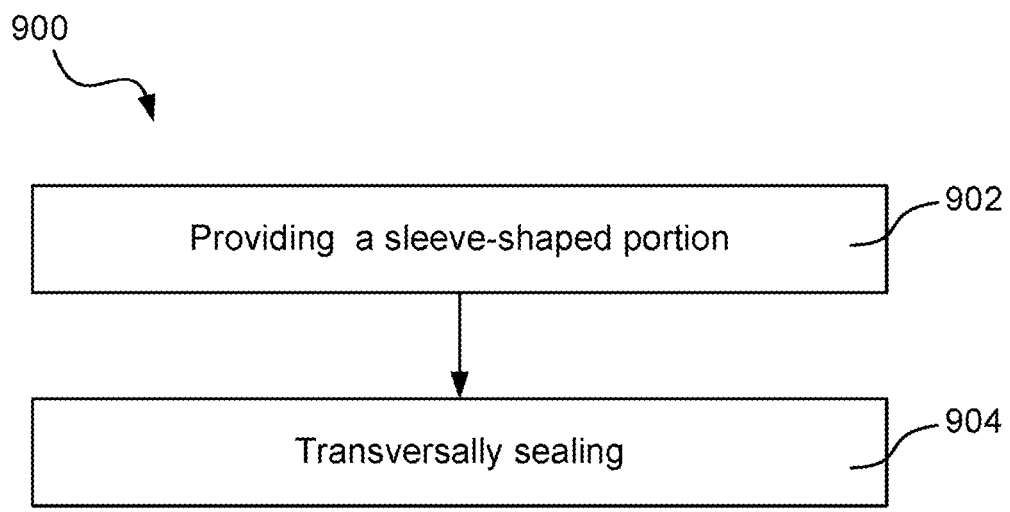
FIG. 9 is a flowchart illustrating steps in a method for producing packages.

FIG. 9 is a flow chart illustrating steps in a method 900. In a first step 902 the sleeve-shaped portion 104 is provided. This may be achieved by feeding the tube 104 into the transversal sealing system 110 in the roll-fed filling machine 100 or it may be achieved by conveying the blank 202a-d, 302a-d to any one of the transversal sealing stations in the blanks-fed machine 200 illustrated in FIG. 2 or the carton bottle machine 300 illustrated in FIG. 3. In a second step 904, the portion 104 is transversally sealed.

It should be understood that expressions such as "under" or "above" refer to a typical situation in which the apparatus or the method are applied and these expressions should therefore be construed broadly, unless otherwise explicitly stated. Further, the skilled person understands that orientation of e.g. the tube is made for ensuring that the product is kept in place and that the sealing principles are not in the same way dependent on the orientation.

Even though it is described that the anvil comprises the first and the second section, placed at different levels, to lower tension in the packaging material forming the transversal sealing, it is also possible to have the ultrasonic horn or the inductor adapted such that the heating is provided at different levels, corresponding to the first and the second section, such that the same effect can be achieved even though the anvil is flat. Further, a combination can also be used, i.e. the anvil with the first and second section as described above and the ultrasonic horn or the inductor with the heating provided at the different levels.

From the description above follows that, although various embodiments of the invention have been described and shown, the invention is not restricted thereto, but may also be embodied in other ways within the scope of the subject-matter defined in the following claims.

The invention claimed is:

1. An anvil for forming a transversal sealing of a sleeve-shaped portion of packaging material holding a liquid product, the sleeve-shaped portion of packaging material having a first part and a second part, with a longitudinal sealing located in the first part, said anvil comprising:
   a main surface, in operation, facing the sleeve-shaped portion of packaging material, and
   a ridge provided on the main surface,
   the ridge comprising a first section and a second section, the second section of the ridge comprising a first peripheral sub-section and a second peripheral sub-section, the first section being a mid-section located between the first peripheral sub-section and the second peripheral sub-section,
   wherein the first section of the ridge is placed below the first peripheral sub-section and the second peripheral sub-section such that, in operation, a stress in the packaging material formed by a hydrostatic pressure formed by the liquid product is shifted from the first part of the sleeve-shaped portion placed above the first section of the ridge to a second part placed above the second section.

2. The anvil according to claim 1, wherein the packaging material is provided with a plastic layer comprising polymers, wherein a vertical distance between the first section and the second section is set with respect to properties of the polymers and/or thickness of the plastic layer and/or stiffness properties of the packaging material.

3. The anvil according to claim 1, wherein a continuous transition from the first section to the second section is provided such that stress in the packaging material is reduced.

4. The anvil according to claim 1, wherein the packaging material is a carton-based packaging material.

5. A transversal sealing system comprising a first and a second anvil according to claim 1, wherein the first anvil, in operation, is placed above the second anvil, and that the second anvil is placed upside down with respect to the first anvil such that the first section of the ridge of the first anvil is placed below the second section of the ridge of the first anvil, and the first section of the ridge of the second anvil is placed above the second section of the ridge of the second anvil.

6. The transversal sealing system according to claim 5, further comprising an ultrasonic horn arranged opposite the first and second anvil such that the portion is placed between the ultrasonic horn and the first and the second anvil.

7. A roll-fed filling machine comprising:
   a transversal sealing system according to claim 5, a package turning device placed downstream the transversal sealing system and configured to turn packages formed by the transversal sealing system upside down, and
   a folding device configured to fold the packages into a final shape.

8. A blanks-fed filling machine comprising:
   a transversal sealing station for closing an end of the portion of packaging material, and
   a filling station for filling product into the portion,
   wherein the transversal sealing station comprises an anvil according to claim 1.

9. A method for producing packages, said method comprising:
   providing a sleeve-shaped portion of packing material having a longitudinal sealing,
   transversally sealing the sleeve-shaped portion of packing material by contacting the sleeve-shaped portion of packing material with an anvil that comprises a main surface facing the sleeve-shaped portion of packing material and a ridge provided on the main surface, the sleeve-shaped portion of packing material being contacted with the anvil such that a first section of the ridge that is a mid-section located between a first peripheral sub-section of the ridge and a second peripheral sub-section of the ridge anvil is in contact with the longitudinal sealing of the sleeve-shaped portion of the packing material, the first section of the ridge being in contact with the longitudinal sealing at a location below locations at which the first peripheral sub-section of the ridge and the second peripheral sub-section of the ridge contact the sleeve-shaped portion of packing material, such that stress in the packaging material formed by hydrostatic pressure of the liquid product is shifted from a first part of the portion of packing material above the first section of the ridge to a second part of the portion of packing material above the first and second peripheral sub-sections of the ridge.

10. The method according to claim 9, wherein the packaging material is provided with a plastic layer comprising polymers, wherein a vertical distance between the first section and the second section is set with respect to properties of the polymers and/or thickness of the plastic layer and/or a stiffness of the packaging material.

11. The method according to claim 9, wherein a continuous transition from the first section to the second section is provided such that stress in the packaging material is reduced.

12. The method according to claim 9, wherein the packaging material is a carton-based packaging material.

13. An anvil for forming a transversal sealing of a sleeve-shaped portion of packaging material holding a liquid product, the sleeve-shaped portion of packaging material having a longitudinal sealing, the anvil comprising:
   a main surface configured to face the sleeve-shaped portion of packaging material during the transversal sealing;
   a ridge provided on the main surface and configured to contact the sleeve-shaped portion of packaging material during the transversal sealing, the ridge extending in a transverse direction;
   the ridge comprising a first section and two peripheral sub-sections, the first section of the ridge being between the two peripheral sub-sections of the ridge relative to the transverse direction;

the first section of the ridge being below the two peripheral sub-sections of the ridge and being configured to contact the longitudinal sealing of the sleeve-shaped portion of packaging material during the transversal sealing while the two peripheral sub-sections of the ridge contact parts of the sleeve-shaped portion of packaging material that are closer to peripheral portions of the sleeve-shaped portion of packaging material than the longitudinal sealing so that during the transversal sealing stress in the packaging material due to hydrostatic pressure formed by the liquid product is shifted from a part of the sleeve-shaped portion of packaging material above the first section of the ridge to parts of the sleeve-shaped portion of packaging material above the two peripheral sub-sections.

14. The anvil according to claim 13, wherein the first section of the ridge is located in a middle portion of the main surface relative to the transverse direction.

15. The anvil according to claim 13, further comprising a continuous transition from the first section to each of the two peripheral sub-sections to reduce stress in the packaging material.

16. The anvil according to claim 13, further comprising a transition from the first section toward each of the two peripheral sub-sections to reduce stress in the packaging material.

* * * * *